Feb. 27, 1968  H. B. EGLESTON  3,370,399
CONTAINER TOP SEALING APPARATUS
Filed April 15, 1965  11 Sheets-Sheet 1
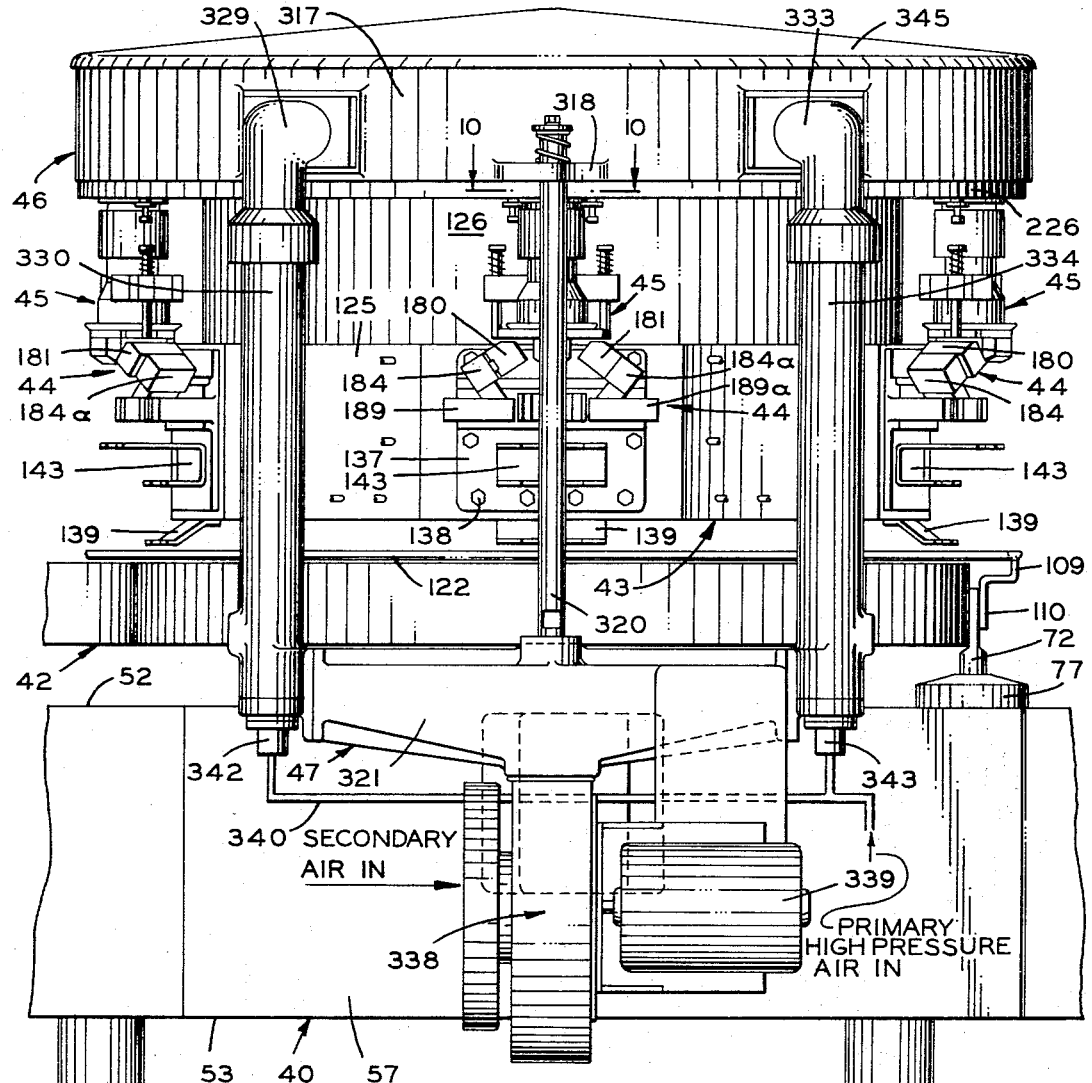
FIG. 1
INVENTOR
HARRY B. EGLESTON
BY
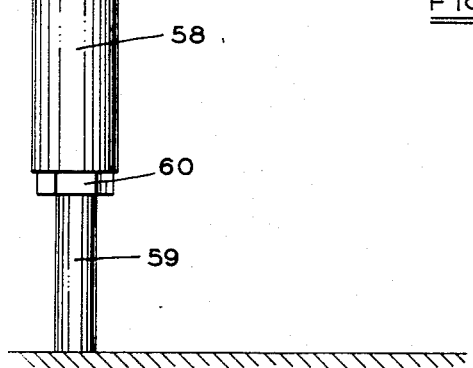
ATTORNEYS Feb. 27, 1968

H. B. EGLESTON 3,370,399

CONTAINER TOP SEALING APPARATUS

Filed April 15, 1965

INVENTOR
HARRY B. EGLESTON
BY
Bower & Patalidis
ATTORNEYS

Feb. 27, 1968 H. B. EGLESTON 3,370,399
CONTAINER TOP SEALING APPARATUS
Filed April 15, 1965 11 Sheets-Sheet 3

INVENTOR
HARRY B. EGLESTON
BY
Bower & Patalidis
ATTORNEYS

Feb. 27, 1968  H. B. EGLESTON  3,370,399
CONTAINER TOP SEALING APPARATUS
Filed April 15, 1965  11 Sheets-Sheet 6

INVENTOR
HARRY B. EGLESTON
BY
Bower & Patalidis
ATTORNEYS

Feb. 27, 1968

H. B. EGLESTON 3,370,399

CONTAINER TOP SEALING APPARATUS

Filed April 15, 1965

INVENTOR
HARRY B. EGLESTON
BY
Bower & Patalidis
ATTORNEYS

Feb. 27, 1968  H. B. EGLESTON  3,370,399
CONTAINER TOP SEALING APPARATUS
Filed April 15, 1965  11 Sheets-Sheet 9

INVENTOR
HARRY B. EGLESTON
BY
Bower & Patalidis
ATTORNEYS

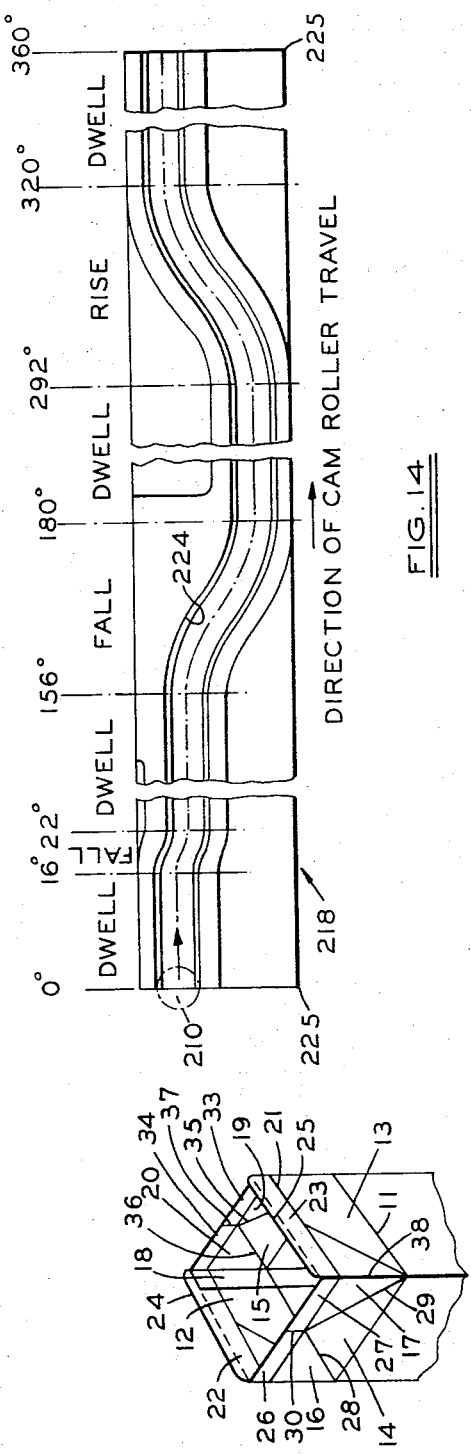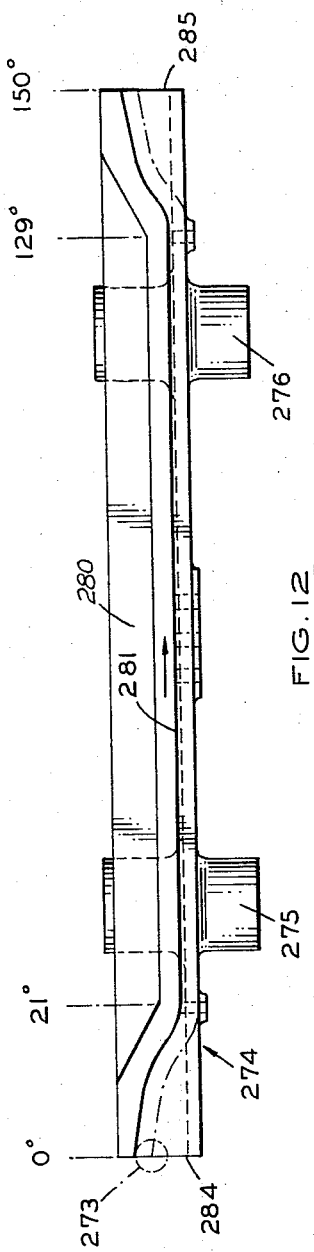

Feb. 27, 1968     H. B. EGLESTON     3,370,399
CONTAINER TOP SEALING APPARATUS
Filed April 15, 1965     11 Sheets-Sheet 11
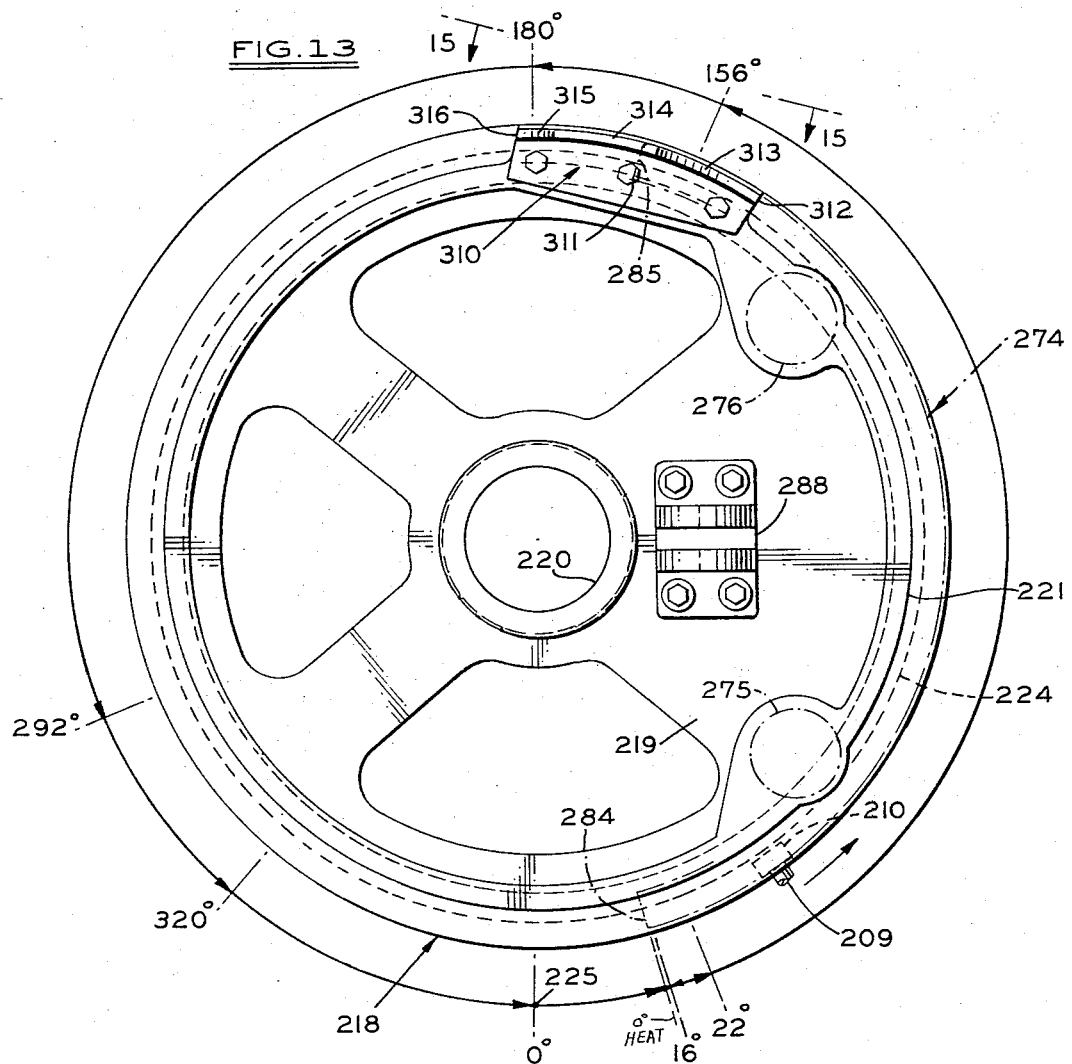
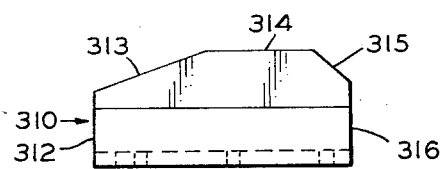
INVENTOR
HARRY B. EGLESTON
BY
*Bower & Patalidis*
ATTORNEYS

United States Patent Office

3,370,399
Patented Feb. 27, 1968

3,370,399
CONTAINER TOP SEALING APPARATUS
Harry B. Egleston, Livonia, Mich., assignor to Ex-Cell-O
Corporation, Detroit, Mich.
Filed Apr. 15, 1965, Ser. No. 448,545
27 Claims. (Cl. 53—379)

ABSTRACT OF THE DISCLOSURE

This invention relates to a continuous motion container end heating and sealing machine for use on thermoplastic coated paperboard. The machine provides for sealing jaws to operate in a timed relationship with a selective heating unit. The sealing jaws act on the container panels to hold them in a predetermined relationship permitting the selective heating unit to act on the container panels with a minimum of heat necessary to insure proper sealing. A safety device is provided to automatically move the heating means out of heating position when the machine is stopped. A plenum structure is provided to permit two heating temperatures during each cycle. The heater system provides for moving heated air from a stationary burner to a rotating point of use.

---

This invention relates in general to container packaging machines, and more particularly to a novel and improved rotary heating and sealing machine for sealing the top ends of thermoplastic coated paperboard containers.

A disadvantage of the prior art paperboard container heating and sealing machines is that they operate with an intermittent motion which limits the speed of operation and the number of containers which can be sealed by such machines. A further disadvantage of said prior art sealing machines is that the intermittent motion causes the fluid in the containers to splash out of the containers. Also, the bubbles in the fluid do not have time enough to evaporate or dissipate before the top end closure panels of the containers are sealed. The prior art heating and sealing machines heat the top end closure panels of the container at positions spaced apart from the sealing positions or stations, and therefore the container top end closure panels must be heated above the normal plastic activation temperature to retain sufficient heat for sealing purposes while the containers are moving to the sealing stations.

In view of the foregoing, it is an important object of the present invention to provide a novel and improved combined heating and sealing machine for paperboard container top ends which operates with a continuous motion and performs the heating and sealing operations at high speed.

It is another object of the present invention to provide a novel and improved rotary heating and sealing machine for sealing the top ends of paperboard containers which operates with a continuous motion so that the fluid in the containers does not splash out of the containers and which provides sufficient time for the bubbles in the fluid to be evaporated or dissipated before the container top end closure panels are sealed.

It is another object of the present invention to provide a novel and improved combined heating and sealing machine for thermoplastic coated paperboard containers which heats and seals the top ends of the containers more quickly than the corresponding prior art machines so that the time interval between heating and sealing is shortened, and the sealing operation can be carried out with a minimum amount of heating for activating the thermoplastic as compared to the amount of heating required by the prior art sealing machines.

It is still another object of the present invention to provide a novel and improved heating and sealing machine for paperboard container top ends which functions to selectively heat only the sealing areas of the container top end closure panels.

It is a further object of the present invention to provide a sealing machine for paperboard container top ends which incorporates a novel rotary heating and sealing assembly that operates with a continuous motion and provides an output greater than that which is achievable by the prior art heating and sealing machines.

It is a still further object of the present invention to provide a novel and improved sealing machine for paperboard container top ends which may be used for containers of different capacities that have the same cross section, and which machine is simple and compact in construction, and efficient and reliable in operation.

It is still another object of the present invention to provide a novel and improved sealing machine for paperboard container top ends which embodies a novel annular plenum for supplying heated air to a plurality of heaters which are mounted on a rotary assembly that moves continuously during a heating and sealing operation.

The combination heating and sealing machine of the present invention includes a rotary assembly which is provided with a plurality of heating and sealing units. The rotary assembly is constructed and arranged to coact with any suitable container forming and filling machine. The rotary assembly picks up the filled containers at a stationary first or load position and continues to rotate and carry the filled containers through a heating cycle and a closing cycle, after which they are discharged without stopping the rotary assembly. When the rotary assembly picks up a filled container at the load station, the container is disposed automatically under the container top end heater means and the heater means is cammed downwardly into the upper open end of the container. Simultaneously, a set of closure or sealing jaws is moved into contact with the container top end enclosure panels and the sealing jaws continue to close until the panels are moved inwardly into a partially closed shape into which is received the heater means. The rotary assembly unit or station carrying the filled container is moved through a predetermined distance along a circular path at the end of which the heater means is retracted and the sealing jaws are advanced to the closed position to seal the top end closure panels of the container. The rotary assembly is provided with a plurality of stations, and each station has its individual heating means and sealing means. All of the heater means at all of the stations are retracted automatically in the event that the machine stops, in order to prevent overheating of the containers at the stations. The heater means at each station is also adapted to move downwardly and upwardly independently of the other stations in order to carry out its individual heating function. Each of the heater means includes a heater head which can be readily dismounted for cleaning and repair purposes.

It is another object of the present invention to provide a sealing machine for container top ends which is adapted to heat, close and seal the top end closure panels of a thermoplastic coated paperboard container, and which includes a support means, a rotary assembly carried by said support means and being provided with a heating means and a sealing means for heating and sealing the top end closure panels of a container, and a stationary hot air plenum disposed in operative engagement with said rotary assembly to supply said heating means with heated air.

Other objects, features and advantages of this invention will be apparent from the following detailed description, appended claims, and the accompanying drawings.

In the drawings:

FIG. 1 is an elevational view of a sealing machine for container tops made in accordance with the principles of the present invention;

FIG. 9 is a fragmentary, horizontal view of the structure illustrated in FIG. 8, shown with parts in section and parts broken away, taken along the line 9—9 thereof, and looking in the direction of the arrows;

FIG. 12 is a developed view of the cam track, shown in FIG. 4, for operating the heater cam follower means;

FIG. 13 is an enlarged, horizontal view of the cam track structure for operating the sealing jaws, taken substantially along the line 13—13 of FIG. 2, and looking in the direction of the arrows;

FIG. 14 is a developed view of the sealing jaws cam track structure shown in FIG. 13;

FIG. 15 is a fragmentary elevational view of the cam track structure shown in FIG. 13, taken along the line 15—15 thereof, and showing the auxiliary heat cam; and, FIG. 16 is a perspective view of the top end of a paperboard container as it appears when first received at the loading station of the heating and sealing machine.

The heating and sealing machine of the present invention is particularly adapted to heat and seal the top end closure panels of cartons or containers of the type shown in my United States Patent No. 3,166,994, which was issued on Jan. 26, 1965. This type container is also shown in the co-pending United States patent applications No. 122,571, filed July 7, 1961 (a continuation-in-part of application No. 707,259, filed Jan. 6, 1958 and now abandoned) which issued Sept. 6, 1966 as United States Patent No. 3,270,940; and No. 226,837, filed Sept. 28, 1962 which issued May 25, 1965 as United States Patent No. 3,185,375 and United States Patents No. 3,120,333 and No. 3,120,335, both issued Feb. 4, 1964. These applications and patents are assigned to the assignee of the subject application, and the disclosures thereof are incorporated herein by reference. For a complete description of a container which may be heated and sealed by the machine of the present invention reference should be made to the aforementioned patents and co-pending applications. The container described in this application is made from paperboard having a polyethylene coating thereon, but it should be understood that any suitable thermoplastic coating may be employed as a coating for the container.

Figure 2:
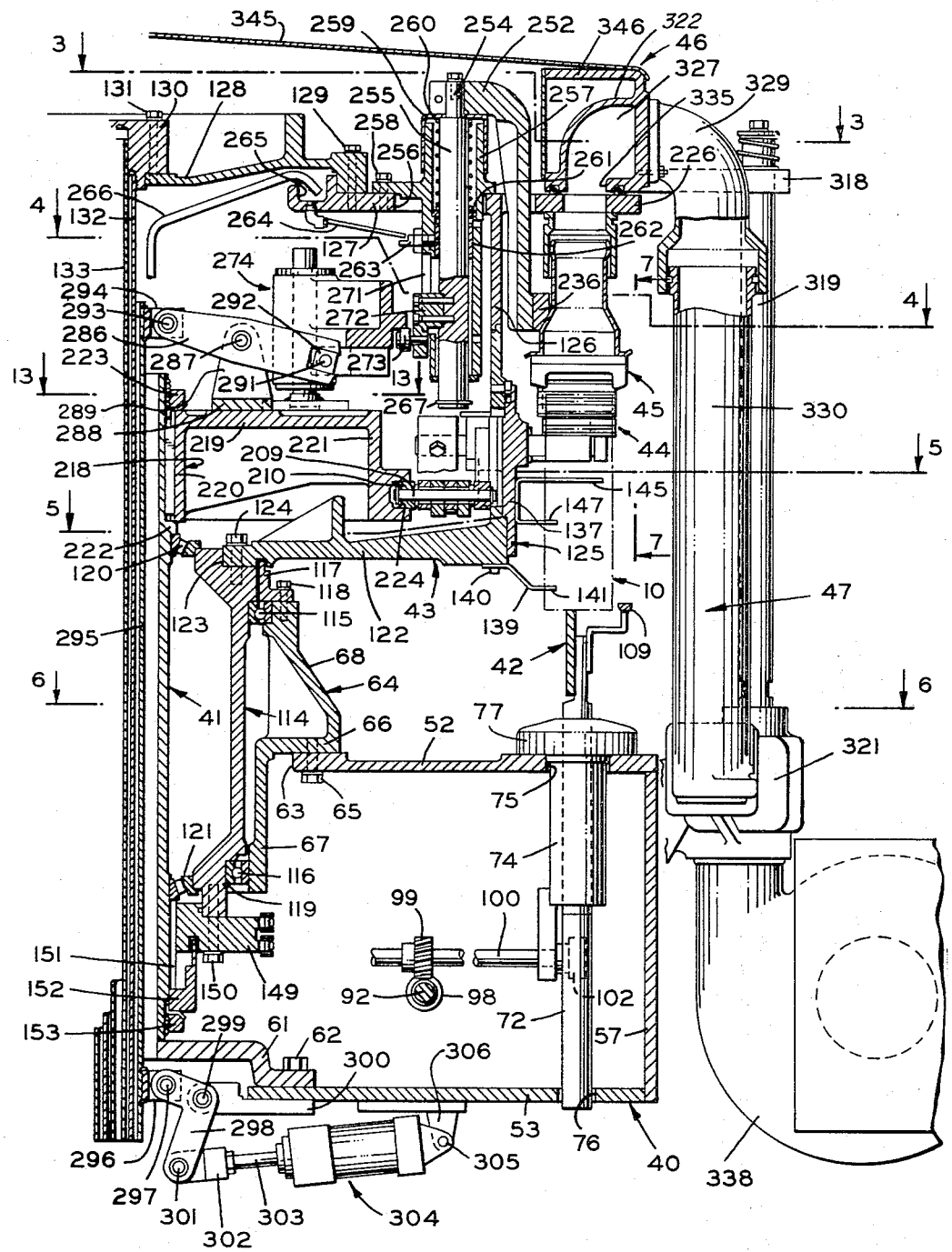
FIG. 2 is a fragmentary, elevational section view, with parts broken away, of the structure illustrated in FIG. 3, taken along the line 2—2 thereof, and looking in the direction of the arrows.
Figure 8:
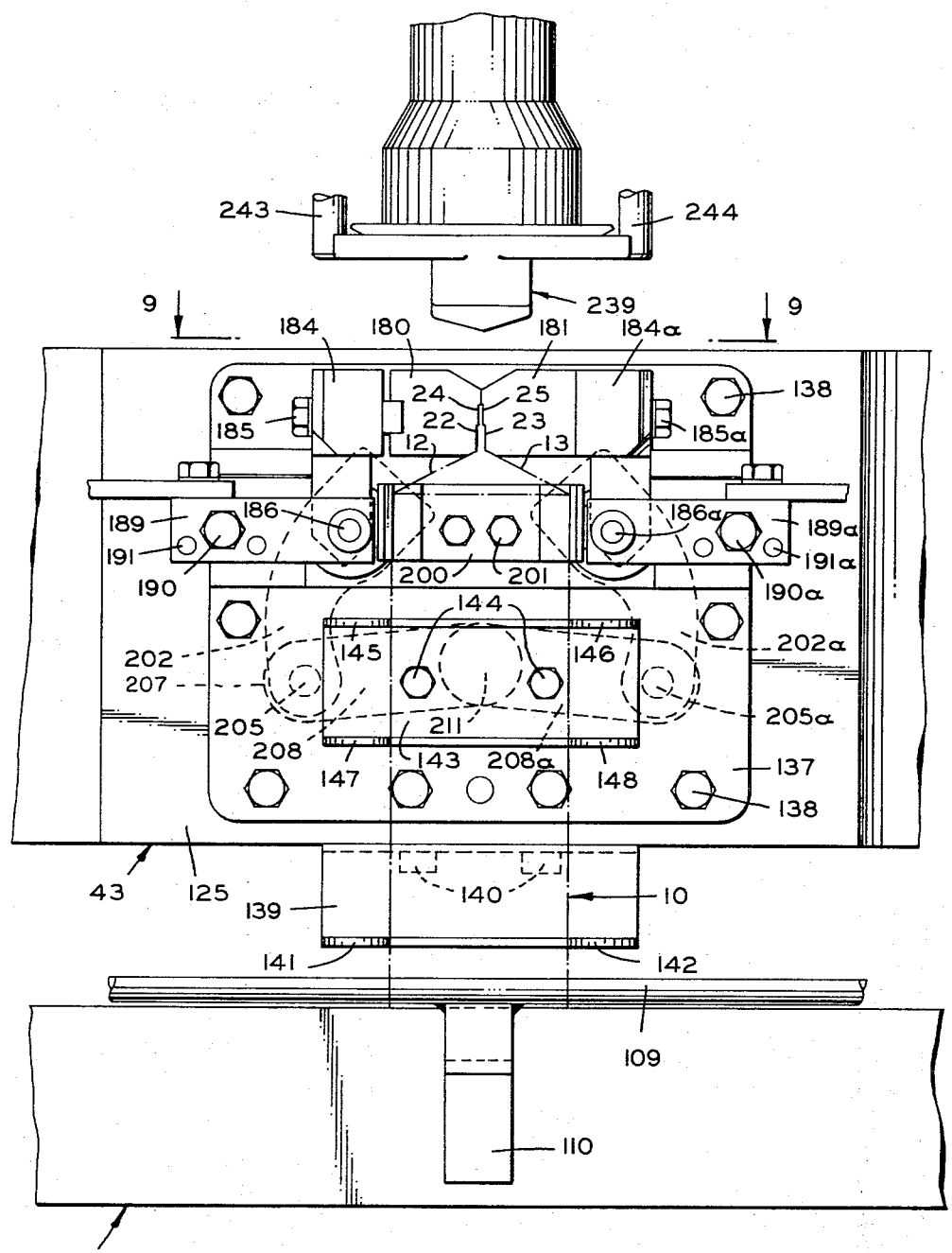
FIG. 8 is an elevational view similar to FIG. 7, showing the heater in the raised or inoperative position, and with the sealing jaws in a closed or sealing position.

Before proceeding with the description of the heating and sealing machine of the present invention, the top end closure panel structure of an illustrative container will be briefly and generally described. As seen in FIGS. 2 and 8, the numeral 10 generally indicates an illustrative container which comprises a four-sided tubular construction which is provided with the following described top end closure panels. The numeral 11, as seen in FIG. 16, indicates the score line which separates the top end closure panels from the body panels of the container 10. As shown in FIG. 16, the top end closure structure contains the roof panels 12 and 13 and the end panels 14 and 15. The end panel 14 is connected to the roof panels 12 and 13 by the fold-back panels 16 and 17, respectively. The end panel 15 is connected to the roof panel 13 and the side seam flap 18 by the fold-back panels 19 and 20, respectively. The score line 21 indicates the top extension of panels 12, 13, 14 and 15.

As shown in FIG. 16, a pair of outer rib panels 22 and 23 is attached to the roof panels 12 and 13, respectively along the score line 21. The upper ends of the rib panels 22 and 23 comprise a pair of sealing flaps 24 and 25, respectively. Secured to the end panel 14 by the fold-back panels 16 and 17, at the score line 21, are the inner rib panels 26 and 27, respectively. The fold-back panels 16 and 17 are connected to the end panel 14 at the score lines 28 and 29, respectively. The inner rib panels 26 and 27 are connected at the score line 30. Attached to the end panel 15 by the fold-back panels 19 and 20 are the inner rib panels 33 and 34, respectively, along the score line 21. The fold-back panels 19 and 20 are connected to the end panel 15 at the score lines 35 and 36, respectively. The inner rib panels 33 and 34 are connected at the score line 37.

The top end closure panels of the container coact with each other in the following described manner to form the closed upper end of the container during a sealing operation. The sealing jaws of the sealing machine cause the roof panels 12 and 13 to move inwardly toward each other in a rotating movement about the score line 11. The movement of roof panels 12 and 13 causes the end panels 14 and 15 to rotate inwardly about the score line 11 and move toward each other. The fold-back panel 17 rotates about score line 38 causing its inside surface to move toward the inside surface of roof panel 13. At the same time, fold-back panel 17 rotates about score line 29 causing its outside surface to move toward the outside surface of end panel 14. Fold-back panel 17 also has a slight rotation about score line 21 with respect to inner rib panel 27, permitting the inner rib panel 27 to remain in a vertical up and down position. Fold-back panels 16, 19 and 20 make the same movements as fold-back panel 17 with panels 12–14–26, 13–15–33 and 12–15–34, respectively. Score lines 30 and 37 move toward each other and substantially meet at the middle of the container 10. The sealing flaps 24 and 25 meet at the top of the container and extend from the middle of one of the body panels of the container to the middle of the opposite body panel.

GENERAL MACHINE DESCRIPTION

Figure 5:
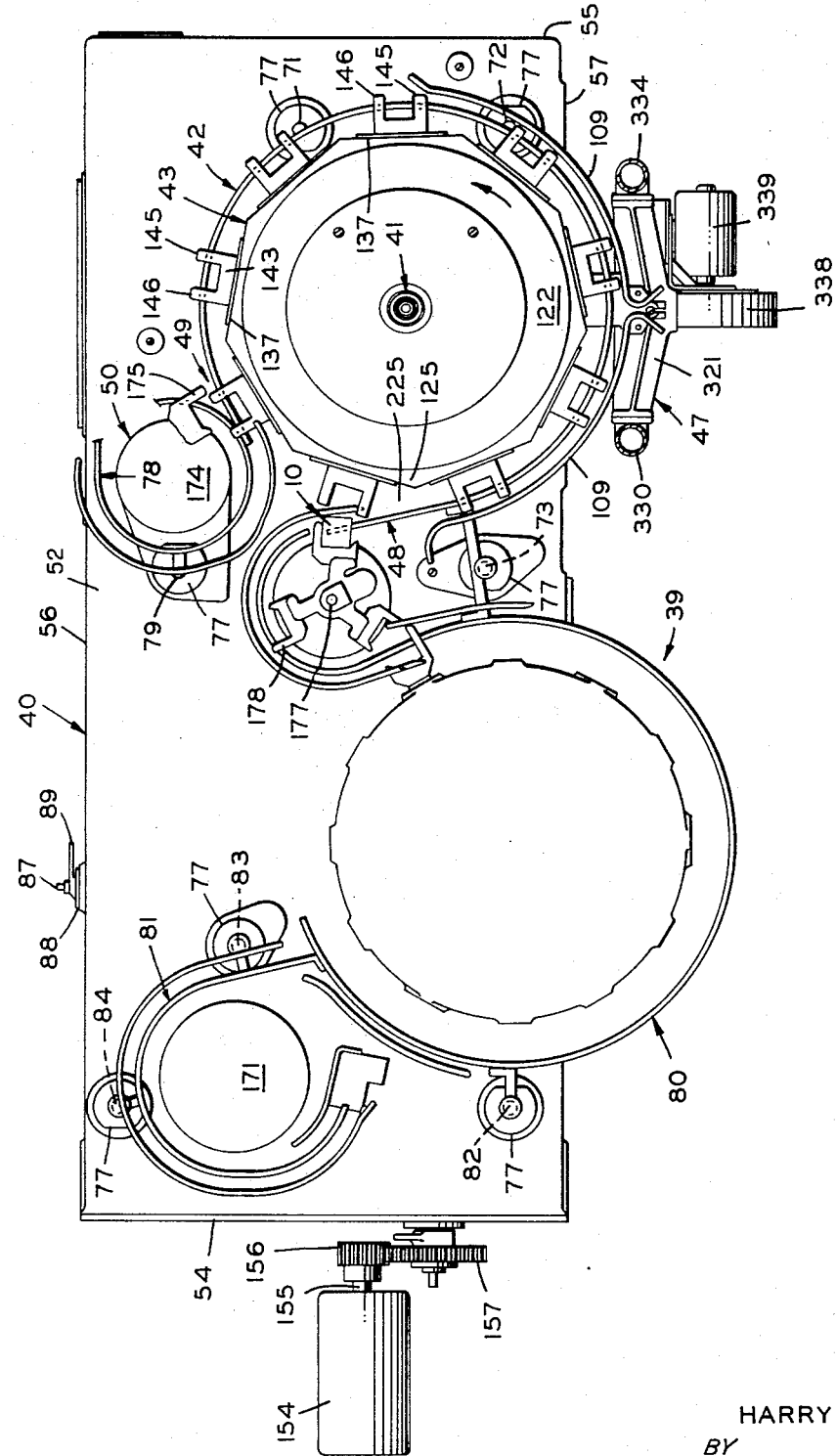
FIG. 5 is a reduced, horizontal section view, with parts removed, of the structure illustrated in FIG. 2, taken along the line 5—5 thereof, and looking in the direction of the arrows.

The combined heating and sealing machine of the present invention may be used with any suitable container forming and filling machine. As illustrated in FIG. 5, a suitable container forming and filling machine, generally indicated by the numeral 39, may be operatively mounted on a common base or housing generally indicated by the numeral 40. The container forming and filling machine delivers the formed and filled containers 10 to the heating and sealing machine of the present invention at the load station generally indicated by the numeral 48. The filled containers are moved by the heating and sealing machine through a circular travel period during which the filled containers go through a heating cycle and a sealing cycle. As shown in FIG. 5, the sealed containers 10 are discharged from the heating and sealing machine at a discharge station, generally indicated by the numeral 49, at which point they are received by the container discharge means, generally indicated by the numeral 50, and the containers are ready for delivery to the consumer.

As shown in FIGS. 1, 2 and 5, the heating and sealing machine of the present invention includes a support means comprising a base or housing, generally indicated by the numeral 40, and a vertically disposed main support tubular post, generally indicated by the numeral 41. Adjustably mounted on the base 40 is a container conveyor rail means, generally indicated by the numeral 42, for conveying the containers 10 from the load station 48 and through the heating and sealing cycles to the discharge station 49. The machine of the present invention further includes a rotary assembly, generally indicated by the numeral 43, on which is formed a plurality of working stations. Each of the working stations is provided with container carrier means for carrying a container along the conveyor rail 42 from the load station 48 to the discharge station 49, as described in detail hereinafter. Each of the working stations is provided with an individual sealing jaw means and heating means generally indicated by the numerals 44 and 45, respectively. The rotary assembly 43 operates with a continuous rotary motion. the rotary assembly 43 picks up a filled container 10 at the load station 48, the container is disposed automatically under a heating head of a heater means 45 and the heater head is cammed downwardly into the open upper end of the container. The sealing jaws at that particular working station are moved simultaneously into contact with the container top end closure panels so as to move the panels inwardly into a partially closed shape for the reception of the heater head.

Heated air is supplied to the heating means 45 by the hot air plenum generally indicated by the numeral 46 in FIGS. 1 and 2. The hot air plenum 46 is circular in cross section and is stationary. A hot air supply means, generally indicated by the numeral 47 in FIGS. 1 and 2, is operatively connected to the hot air plenum 46. The rotary assembly 43 carries the filled containers through a predetermined heating cycle at the end of which the heater head is retracted and the sealing jaws are advanced to the closed position to seal the top end closure panels of the container. Continued movement of the rotary assembly carries the container to the discharge station 49. The individual features of the machine will now be explained and described in detail.

MACHINE SUPPORT MEANS

Figure 6:
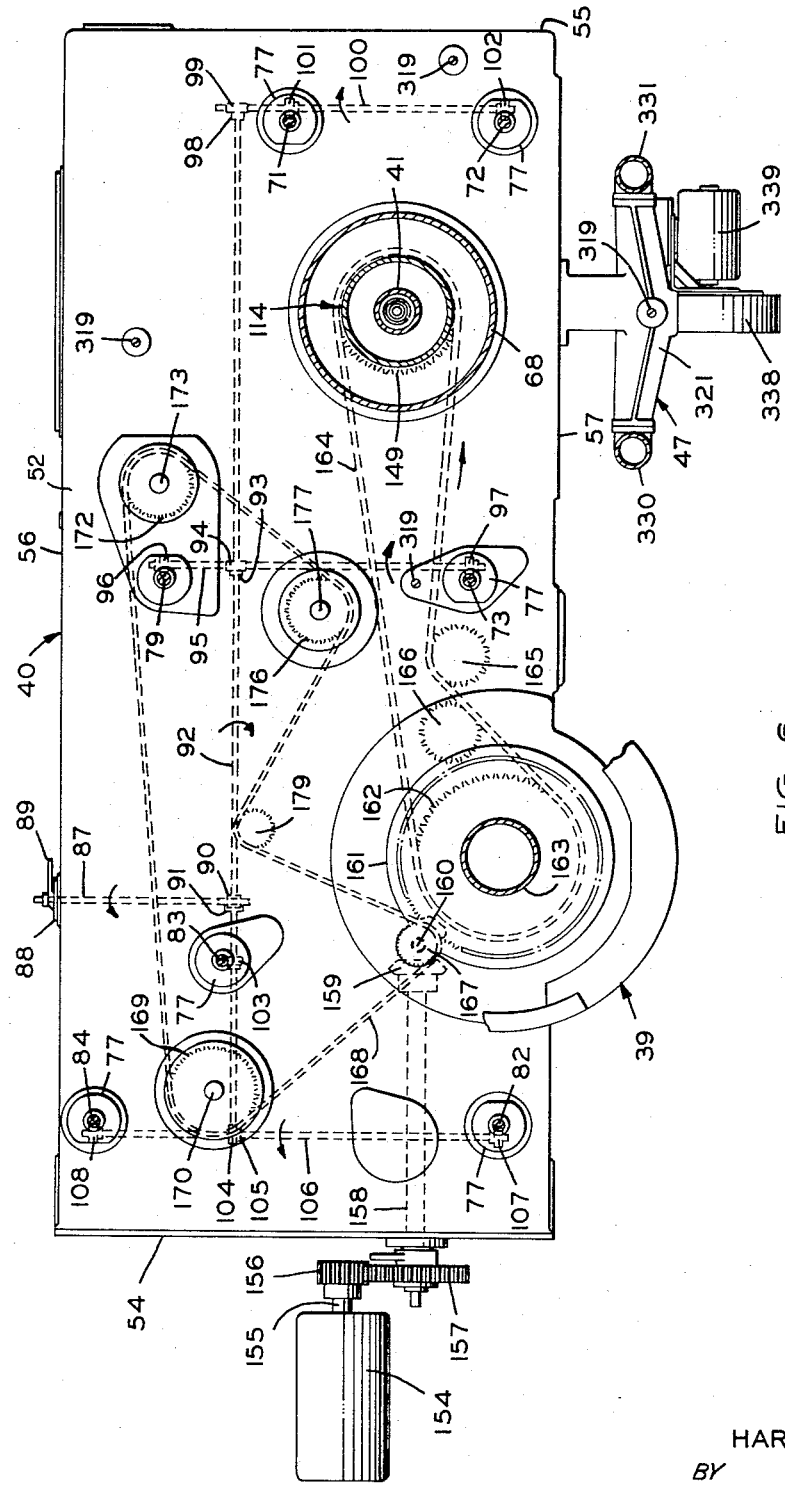
FIG. 6 is a reduced, horizontal section view, with parts removed, of the structure illustrated in FIG. 2, taken along the line 6—6 thereof, and looking in the direction of the arrows.

As shown in FIGS. 5 and 6, the machine base 40 comprises a substantially rectangular housing having a top wall 52, a spaced apart bottom wall 53, end walls 54 and 55, and front and rear walls 56 and 57, respectively. The base 40 may be made from any suitable material. As shown in FIG. 1, the base 40 is provided with a plurality of suitable supporting legs which each include a first tube 58 that is fixedly secured to the lower end of the housing 40 by any suitable means, as by welding. A second tube 59 is threadably mounted in the lower end of the tube 58 and is secured in place by means of the lock nut 60. The lower end of the tube 59 engages the ground or floor surface on which the machine is supported.

As shown in FIG. 2, the support means of the machine includes the vertically disposed main support tubular post 41 which is fixedly secured at the lower end thereof in a suitable circular support bracket 61 that is fixedly secured to the lower wall 53 of the base 40 by any suitable means as by the bolt 62. The tubular post 41 functions as an axle about which the rotary assembly 43 is rotated. The post 41 extends upwardly through the circular opening 63 formed in the top wall 52 of the base 40. A separately formed base extension, generally indicated by the numeral 64, is mounted in the opening 63 and is fixedly secured to the top wall 52 of the base 40 by any suitable means, as by a plurality of bolts 65. The base extension 64 includes the horizontal ring portion 66 which seats on the base wall 52 and to the inner end of which is formed the integral cylindrical extension 67 that extends downward vertically into the base 40. Integrally formed on the outer end of the ring portion 66 is the inwardly and upwardly sloping tubular portion 68. As explained in detail hereinafter, the lower end of the rotary assembly 43 is rotatably mounted between the vertical post 41 and the base extension 64.

As shown in FIG. 5, the container conveyor rail 42 is disposed about the periphery of the rotary assembly 43 for supporting a plurality of containers in operative relationship to the working stations on the rotary assembly. The illustrative rotary assembly 43 is provided with nine working stations or units, but it will be understood that the machine may be provided with any desired number of working stations. The conveyor rail 42 is fixedly secured to a plurality of vertically disposed lifter racks indicated by the numerals 71, 72 and 73. The lifter racks are constructed similarly and a detailed disclosure of the lifter rack 72 is shown in FIG. 2. As shown in FIG. 5, the lifter racks are spaced apart about the rotary assembly 43, so as to support the conveyor rail 42 its entire length of travel around the periphery of the rotary assembly. The conveyor rail 42 comprises a single vertically disposed plate between the discharge station 49 and the lifter rack 72. Between the load station 48 and the lifter rack 72, the conveyor rail 42 comprises a pair of spaced apart plates.

As shown in FIG. 2, the pair of spaced apart conveyor rails are secured to the upper end of the lifter rack 72 by any suitable means, as by welding. The lifter rack 72 comprises a cylindrical post on one side of which is formed a conventional gear rack. The lifter rack 72 is supported for vertical sliding movement in the vertically disposed tubular rack guide 74 which is disposed in the base 40 and extends upwardly through the opening 75 in the housing top wall 52. The housing bottom wall 53 is provided with an opening 76 through which extends the lower end of the lifter rack 72. A retainer flange 77 is secured to the upper end of the rack guide 74 and is seated on the outer face of the housing top wall 52 and retains the rack guide in vertical position in the base 40. The racks 71 and 73 are operatively supported by similar structure and their retainer flanges have been marked with the same numeral 77.

The lifter racks 71, 72 and 73 are adapted to be moved upwardly and downwardly for adjusting the conveyor rail 42 to various positions for supporting a plurality of sizes of containers in operative relation to the heating and sealing means 45 and 44, respectively, of the rotary assembly 43. The adjusting of the conveyor rail 42 upwardly and downwardly permits the heating and sealing machine to operate on quart, pint, and half-pint containers having the same cross section. The lifter racks are adapted to be simultaneously adjusted upwardly and downwardly as described in detail hereinafter.

As shown in FIG. 5, the discharge station 49 is provided with a semi-circular container conveyor rail 78 which is mounted on a vertically disposed lifter rack 79 constructed in the same manner as the rack 72. The container forming and filling unit 39 may also be provided with conveyor rails as 80 and 81 for co-acting with the conveyor rail 42. These conveyor rails 80 and 81 are illustrated in FIG. 5 as being mounted on the lifter racks 82, 83, 84 and 73, all of which are constructed in the same manner as the lifter rack 72.

All of the aforementioned lifter racks are simultaneously adjustable upwardly and downwardly by a manually operated, interconnected set of shafts and gears, as shown in FIG. 6. The manual adjustment means for adjusting the lifter racks upwardly and downwardly comprises a crank shaft 87 which extends out through the front base wall 56 and is suitably supported in the journal member 88. A shaft locking means 89 is operatively mounted on the outer end of the shaft 87 to lock the same in an adjusted position. Any suitable crack may be mounted on the outer end of the shaft 87 for rotating the shaft in the desired direction. The inner end of the crankshaft 87 is supported by any suitable means in the housing 40 and it is provided with a worm 90 that is drivingly engaged with a worm gear 91 fixed on the longitudinally extended main lifter drive shaft 92. The shaft 92 is provided with a worm 93 which drives the worm gear 94 mounted on the transversely disposed lifter rack drive shaft 95. The drive shaft 95 may be supported in the base 40 by any suitable means. As shown in FIG. 6, a pair of pinion gears 96 and 97 are fixed on the opposite ends of the shaft 95 for driving engagement with the gear racks on the lifter racks 79 and 73, respectively.

As shown in FIG. 6, one end of the main lifter drive shaft 92 extends toward the housing end wall 55 and is provided with a worm 98 which meshes with the worm gear 99 that is fixed on the front end of a transversely disposed lifter rack drive shaft 100. The drive shaft 100 may be supported in the housing 40 by any suitable means, and is provided with a pair of pinion gears 101 and 102 for driving engagement with the lifter racks 71 and 72, respectively.

As shown in FIG. 6, the lifter racks 82, 83 and 84 are mounted in lifter rack guides constructed the same as guide 74, and they are supported by the same type of flange 77. These last mentioned lifter racks are also adjusted simultaneously by the crackshaft 87 when the lifter racks 71, 72, 73 and 79 are adjusted. The main drive shaft 92, which is supported in the housing 40 by suitable means, is further provided with a pinion gear 103 that engages the gear rack formed on the lifter rack 83. The drive shaft 92 is also provided on the end thereof adjacent the housing end wall 54 with a worm 104 that is in driving engagement with the worm gear 105 which is fixed on the transversely disposed lifter drive shaft 106. The shaft 106 is supported in the housing 40 by suitable means and is provided with a pair of spaced apart pinion gears 107 and 108 which are in driving engagement with the gear racks on the lifter racks 82 and 84, respectively. It will be seen from an inspection of FIG. 5 that the lift rack 73 functions to support both the discharge end of the filling machine conveyor rail 80 and the loading end of the conveyor rail 42.

As shown in FIG. 2, the conveyor rail 42 is disposed in the lowermost position for supporting quart containers 10. In order to adjust the conveyor rail 42 upwardly, the crankshaft 87 is turned in the direction indicated by the shaft arrows in FIG. 6, whereby the interconnected shafts 92, 100 and 106 will move the aforedescribed lifter racks upwardly to the desired positions for supporting either pint or half-pint containers on the conveyor rail 42 as desired. As shown in FIGS. 1, 5 and 8, the conveyor rail 42 may be provided with guide rails as 109 which are fixedly connected to the rail 42 by suitable brackets as indicated by the numeral 110.

ROTARY ASSEMBLY

As shown in FIGS. 2 and 6, the rotary assembly 43 includes a drive column generally indicated by the numeral 114, and which is tubular and is telescopically mounted about the main support post 41. The drive column 114 is rotatably supported about the outer periphery thereof by the vertically spaced apart bearings 115 and 116 which are supported on the base extension 64. The bearing 115 is secured in operative position by the main bearing retainer ring 117 which is fixedly secured to the base extension 64 by any sutiable means, as by a plurality of bolts 118. The lower bearing 116 is retained in place by any suitable means, as by the retainer ring 119. The drive column 114 is also journaled relative to the main support post 41 by means of the vertically spaced apart end thrust bearings 120 and 121.

The rotary assembly 43 includes a working station housing which comprises a horizontal annular base member 122 as shown in FIG. 2. The station housing base member 122 is provided with the axial opening 123 for telescopic mounting of the base member 122 about the main support post 41. The station housing base member 122 is fixedly connected to the upper end of the drive column 114 by any suitable means, as by means of the bolts 124. As shown in FIGS. 2 and 5 the station housing further includes the vertical cylindrical outer wall 125 which is connected to the outer periphery of the base member 122 and which is provided with nine working stations. The station housing wall 125 is also shown in FIG. 1 but for the sake of clarity some of the heating and sealing units have been omitted at some of the stations.

Figure 3:
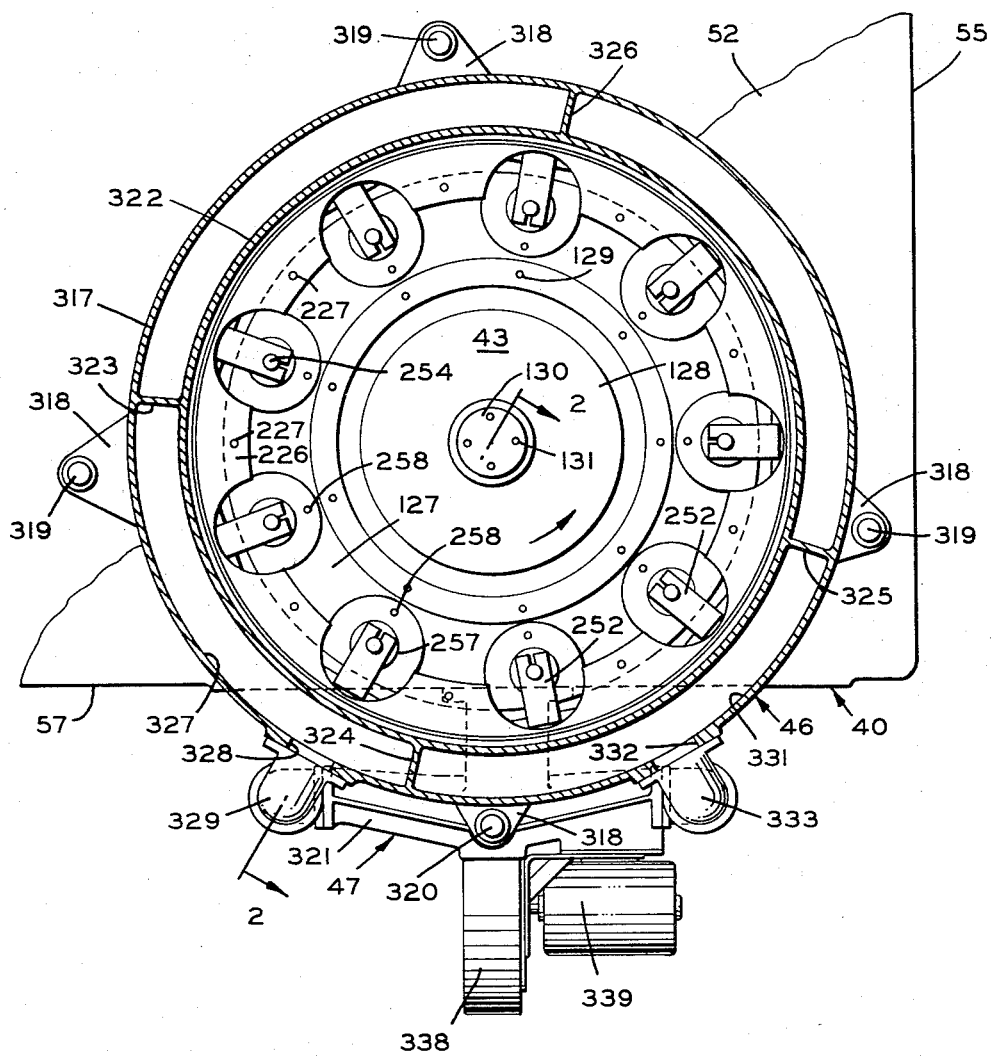
FIG. 3 is a fragmentary, horizontal section view of the structure illustrated in FIG. 2, taken along the line 3—3 thereof, and looking in the direction of the arrows.

The rotary assembly 43 further includes a heater housing comprising a vertical cylindrical wall 126 which is connected at the lower end thereof to the upper end of the station housing wall 125 by any suitable means. As shown in FIGS. 2 and 3 the heater housing further includes the annular flange or horizontal top wall 127 which extends inwardly from the upper end of the wall 126. A circular main top cover 128 is fixedly connected by any suitable means to the horizontal top wall 127 as by a plurality of bolts 129. The cover 128 is connected to the axial hub 130 by means of a plurality of bolts 131. As illustrated in FIG. 2, a pair of service tubes 132 and 133 are fixedly connected at the upper ends thereof to the hub 130 by any suitable means and these tubes extend outwardly through the main support post 41.

As shown in FIG. 9, the station housing wall 125 is provided at each of the working stations with an opening 136 which is enclosed by a plate 137 that is secured in place by a plurality of bolts 138.

As generally illustrated in FIG. 5, each of the working stations is provided with a container carrier means for moving a container over the conveyor rail 42. A station carrier means is illustrated in FIG. 8. The carrier means includes a plurality of spaced apart carrier fingers which extend outwardly from the station housing wall 125. As shown in FIGS. 2 and 8, a lower carrier plate 139 is fixedly secured to the bottom surface of the station housing base member 122 by the screws 140. Integrally formed on the outer end of the carrier plate 139 is a pair of horizontally disposed, spaced apart carrier fingers 141 and 142 between which is adapted to be carried the lower end of container 10. A U-shaped carrier plate 143 has its bight portion disposed on the cover plate 137 and is secured thereto by means of a plurality of screws 144. The upper and lower legs of the U-shaped carrier plate 143 are provided with the integral spaced apart carrier fingers 145 and 146, and 147 and 148, respectively. The last mentioned carrier fingers are adapted to be disposed about the upper end of a container 10 as shown in FIG. 8. As shown in FIG. 2, it will be seen that the upper set of carrier fingers 145 and 146 are formed so as to extend outwardly beyond the other carrier fingers 141, 142, 147 and 148.

The rotary assembly 43 is adapted to be rotated in a counterclockwise direction, as viewed in FIG. 5. The rotary assembly 43 may be rotated through the heating and sealing operations by any suitable means, as for example by the power drive means illustrated in FIG. 6. As best seen in FIG. 2, the drive means includes a drive sprocket 149 which is fixedly secured to the lower end of the drive column 114 by any suitable means, as by a plurality of screws 150. The drive sprocket encircles the support spacer 151 for the bearing 121. The lower end of the spacer 151 is supported by the bearing retainer cap 152. The bearing retainer cap 152 is secured in place on the support post 41 by means of the threaded lock ring 153.

As shown in FIG. 6, the drive sprocket 149 is powered by a suitable electric motor indicated by the numeral 154 and a chain and sprocket drive train. In the illustrative power drive embodiment of FIG. 6, the motor 154 is also shown as driving the container forming and filling machine, 39. The motor 154 is provided with the output shaft 155 on which is fixed the drive gear 156. The gear 156 drives the gear 157 which is fixed on the outer end of the main drive shaft 158. The shaft 158 is rotatably mounted in the base housing 40 by any suitable means. The inner end of the drive shaft 158 carries a bevel gear 159 which meshes with a similar gear mounted on the vertical pinion shaft 160. The shaft 160 is provided with a suitable drive gear which engages the driven gear 161 that is rotatably mounted on the filler machine post 163, by any suitable means, and which has fixed thereto the drive sprocket 162. A drive chain 164 is operatively mounted about the sprockets 162 and 149 for rotating the drive column 114 of the rotary assembly 43. The drive chain 164 also engages the idler sprocket 165 and the chain take-up means 166.

As shown in FIG. 6, the drive means may also be employed to operate the load and discharge accessories for the filling machine and the sealing machine of the present invention. The vertical pinion shaft 160 is provided with a drive sprocket 167 which drives the chain 168. The chain 168 drives the sprocket 169 mounted on the vertical shaft 170 which is connected to the rotating member 171 shown in FIG. 5, for operating a container carrier means for feeding container blanks to the forming and filling means 39. The drive chain 168 also drives the sprocket 172 mounted on the vertical shaft 173 at the discharge station for the sealing machine of the present invention. The shaft 173 is adapted to rotate the member 174 which rotates the container carrier means 175 for discharging finished containers from the sealing machine (FIG. 5).

As shown in FIG. 6, the drive chain 168 also rotates the sprocket 176 on the vertical shaft 177 which carries the container carrier means 178 for conveying filled containers from the filling machine 39 to the sealing machine. In FIG. 6, the numeral 179 indicates an idler sprocket about which the drive chain 168 passes.

Figure 7:
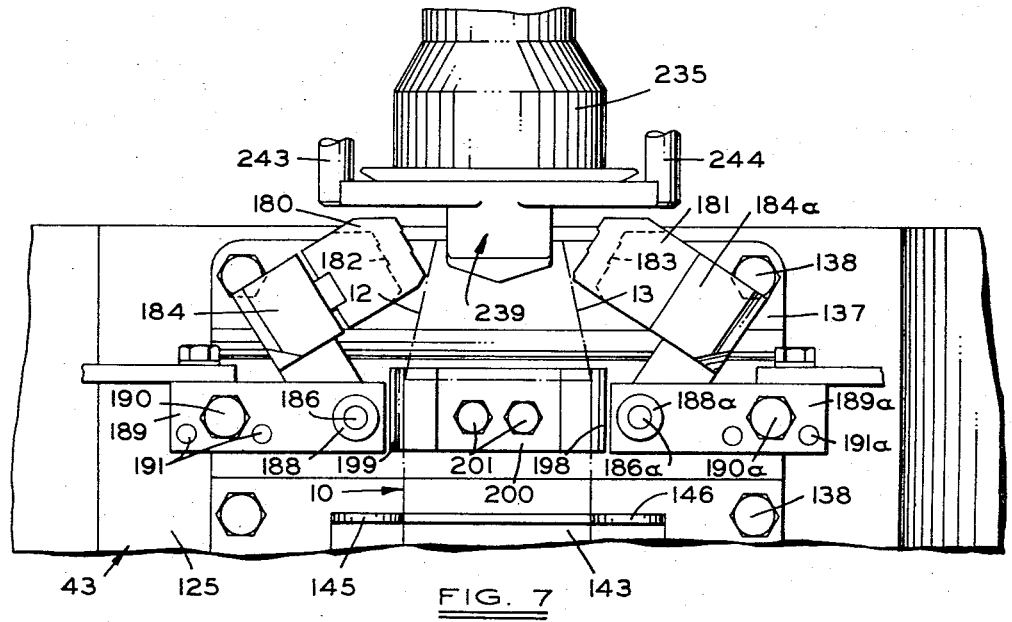
FIG. 7 is a fragmentary, enlarged, elevational view of the structure illustrated in FIG. 2, taken along the line 7—7 thereof, looking in the direction of the arrows, and showing a heater in the lowered or operative position with the sealing jaws partially closed.

Each of the working stations of the machine of the present invention is provided with an individual sealing jaw means. FIGS. 7, 8 and 9 illustrate the details of each of the sealing jaw means. As shown in FIG. 7, the sealing means at each working station comprises a pair of suitable sealing jaws as indicated by the numerals 180 and 181. The left-hand sealing jaw 180 is shown in solid lines in FIG. 7 in a slightly advanced or closed position for slightly closing the top closure panels of the container 10. The numeral 182 indicates the dotted line fully open position, or dwell position, of the left-hand jaw which it assumes during a loading and discharging operation. The right-hand sealing jaw 181 is also shown in solid lines in FIG. 7 in a slightly advanced or closed position to partially close the top closure panels of a container. The numeral 183 indicates the dotted line dwell position of the right-hand sealing jaw 181 when it is in the fully open position for loading and discharging containers. The sealing jaws 180 and 181 are shown in the fully closed or sealing position in FIG 8. The sealing jaws 180 and 181 may be any suitable water cooled type sealing jaws. The sealing jaws 180 and 181 are moved between the operative and inoperative position by means of a cam and toggle arrangement, as more fully described hereinafter.

As shown in FIGS. 7, 8 and 9, the left-hand sealing jaw 180 is fixedly secured to the pivot arm 184 by any suitable means, as by a plurality of screws 185. As shown in FIG. 9, the lower end of the pivot arm 184 is provided on the outer side thereof with the pivot pin 186 which is secured in an inwardly extended hole in the pivot arm 184 by means of the set screw 187. The pivot pin 186 extends sidewardly outward from the lower end of the pivot arm 184 and is rotatably mounted in the bushing 188. As shown in FIGS. 7 and 9, the bushing 188 is carried by the pivot support plate 189 that is secured to the outwardly extended support block 192 by means of the screw 190 and the pair of dowel pins 191. The support block 192 is connected to the cover plate or station plate 137 by any suitable means.

As shown in FIG. 9, the pivot arm 184 is provided on the lower end thereof with the integral inwardly extended pivot shaft 193 which is journaled in the bushings 194 mounted in the hole 195 formed in the support block 196. The block 196 is connected to the station plate 137. The washer 197 is axially aligned with the bushing 188 mounted on pivot support plate 189. A shoulder on the inner end of the pivot arm 184 positions the pivot shaft 193 a predetermined distance from the cover plate 137. The pivot shaft 193 is part of pivot arm 184 and is axially aligned with the pivot pin 186.

Each of the working stations is provided with a pair of container guide arms 198 and 199 as shown in FIGS. 7 and 9. These guide arms extend outwardly from the plate 200 which is secured to the station plate 137 by any suitable means, as by the screws 201.

It will be understood that the right-hand sealing jaw 181 is pivotally mounted on the station plate 137 in the same manner as described for the left-hand sealing jaw 180 and the similar supporting structure is marked with corresponding numerals followed by the small letter "a."

The sealing jaws 180 and 181 are operated by the following described toggle link and cam roller means. As shown in FIG. 8, the upper end of a vertically disposed sealing jaw toggle link 202 is fixedly connected to the inner end of the pivot shaft 193 for jaw 180, pivot shaft 193 is not seen in FIG. 8 because it is hidden behind and aligned with pivot pin 186. A similar toggle link 202a is shown in FIG. 9 connected to the inner end of the pivot shaft 193a for the jaw 181, pivot shaft 193a is not seen in FIG. 8 because it is hidden behind and aligned with pivot pin 186a. As shown in FIG 9, the lower end of the toggle link 202 is bifurcated and has two spaced apart connecting end members indicated by the numeral 204. The toggle link end members 204 are pivotally connected by means of the toggle link pin 205 to a pair of mating, bifurcated end members 207 on the outer end of a cam roller toggle link 208. The pivot pin 205 is fixed to the link end members 204 by means of the key 206. The lower end of the toggle link 202a is connected similarly to the outer end of the toggle link 208a as shown in FIGS. 8 and 9. As shown in FIGS. 9, the inner ends of the cam roller toggle links 208 and 208a are connected pivotally by the cam roller shaft 209 which carries on the outer ends thereof the cam rollers 210 and 211. The outwardly disposed cam roller 211 is rollably mounted between the two vertically disposed cam roller guides 212 and 213 which are connected fixedly to the supporting block 196 by any suitable means as by the screws 214 and the cam roller guides 212 and 213 have flat, straight and parallel surfaces acting on cam roller 211 permitting it movement only in an upward or a downward direction, as viewed in FIG 8.

It will be seen that if the cam roller 210 is moved upwardly and downwardly, the aforedescribed toggle links will function to move the sealing jaws 180 and 181 between the open and closed operating positions. For example, with the cam roller 211 in the position shown in FIG. 8, the toggle links 202 and 202a have moved the sealing jaws 180 and 181 to the closed position. When the cam roller 211 is moved upwardly by means of a hereinafter described cam coacting with the roller 210, the sealing jaws 180 and 181 will be moved to the completely open or partly open positions shown in FIG. 7.

The cam rollers 210 for all of the working stations are operatively engaged with the sealing jaw operating cam 218 in the manner shown in FIGS. 2, 9, 13 and 14. The cam 218 is a stationary cam that is fixed to the upper end of the main supporting post 41 as shown in detail in FIG. 2. As shown in FIG. 13, the cam 218 is circular in plan configuration and is provided with the top wall 219 that has a plurality of openings formed therethrough. As shown in FIG. 2, the cam 218 is provided with the inner peripheral vertical wall 220 which is telescopically mounted about the upper end of the main support post 41. The lower end of the cam wall 220 is seated on a shoulder 222 formed on the post 41. A locking ring 223 is threadably mounted on the upper end of the post 41 and secures the cam 218 in fixed position on the post 41. The cam 218 further includes the outer peripheral vertical wall 221 in which is formed the outwardly facing cam track 224 in which is rollably received the aforedescribed cam roller 210 for operating the sealing jaws 180 and 181.

The cam 218 operates the cam roller 210 in the following described manner. The zero reference position or starting position is indicated in FIGS. 5, 13 and 14 by the numeral 225. As viewed in FIG. 13, the rotary assembly 43 drives the cam roller 210 in the counterclockwise direction. Assuming a working station is at the zero reference position 225, it would be in a position relative to the cam track 224 as viewed in elevation in FIG. 14. The zero reference position 225 would be the position on the container conveyor track 42 where a filled container 10 has been transferred from a filling machine 39. Continued rotation of the work station carrying the particular cam roller 210 would move the cam roller through an angular distance of 16° at the same level. In the next 6° of angular movement, the cam 210 is cammed downwardly to move the sealing jaws 180 and 181 from the open position 182 and 183 shown in FIG. 7 to the solid line position in FIG. 7 for slightly closing the top end closure panels of the container and which is the position assumed during the heating cycle.

As shown in FIGS. 13 and 14, the cam roller 210 then moves at a constant dwell or elevation level for an angular distance of 134° during which time the heating cycle is carried out, as described hereinafter. Continued rotational movement of the cam roller 210 provides a downward or fall movement of the cam roller 210 by the cam track 224 for an angular distance of 24°. It will be seen that the downward movement of the cam roller 210° will move the aforedescribed toggle link arrangement to pivot the sealing jaws 180 and 181 to the closed or sealing position shown in FIG. 8. The cam roller 210 is maintained in a dwell or lowered position for the next 112° of angular movement to permit the container top enclosures to be completely sealed. The sealing jaws are water cooled during this period by any suitable water supply means.

As shown in FIG. 14, the cam roller 210 is cammed upwardly and rises during the next 28° of angular movement to open the sealing jaws to the fully open position to permit the container to be discharged from that particular working station. The cam roller 210 is held for the next 40° in the elevated dwell position shown by the cam track 224, as shown in FIG. 14, to permit discharge of the completely sealed container and the reception at the load station of a filled container from the filling machine 39.

Figure 11:
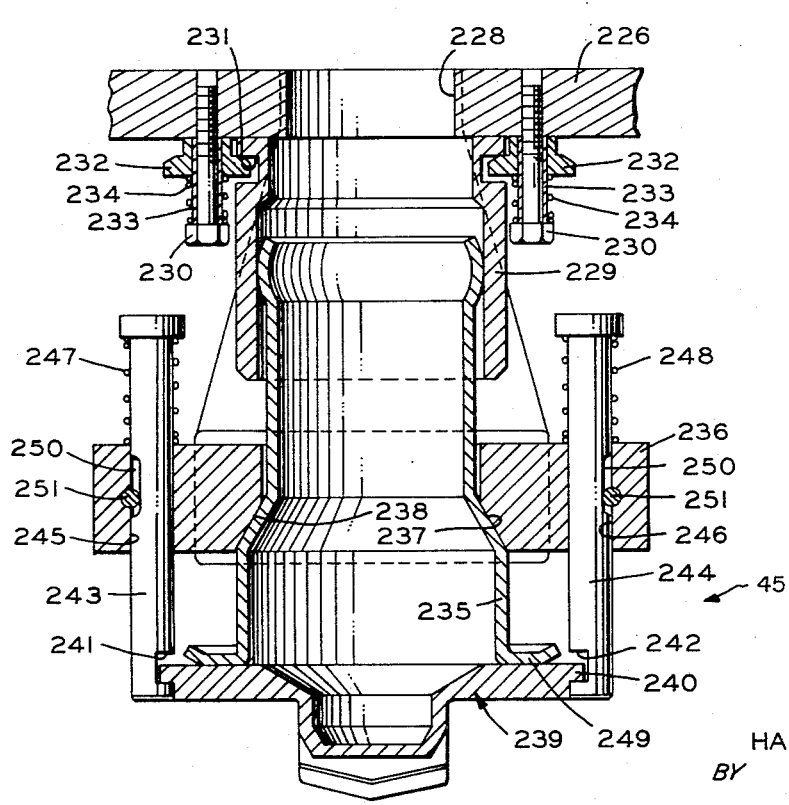
FIG. 11 is an elevational section view of the structure illustrated in FIG. 10, taken along the line 11—11 thereof, and looking in the direction of the arrows.

As best seen in FIGS. 2 and 11, the heating means 45 for each of the working stations is carried by an annular plate or heater carrier 226 which is disposed about the housing wall 126 and secured to the housing wall 127 by a plurality of screws 227 (FIG. 3). The heater carrier 226 thus rotates with and forms a part of the rotary assembly 43. As shown in FIG. 2, the heater carrier 226 is in sliding sealing engagement with the lower side of the hot air plenum 46. The heater carrier 226 is provided at each of the work stations with the hot air inlet 228 as shown in FIG. 11. The heating means 45 at each of the work stations comprises a heater body sleeve 229 which is detachably secured to the lower side of the heater carrier 226 by the pair of attachment screws 230. The heater body sleeve 229 is provided on the upper end thereof with the peripheral groove 231 which is adapted to receive the flanges of a pair of retainer sleeves 232. Each of the retainer sleeves 232 is mounted for sliding movement on a spacer sleeve 233 and is retained against the lower side of the heater carrier 226 by a compression spring 234.

Figure 10:
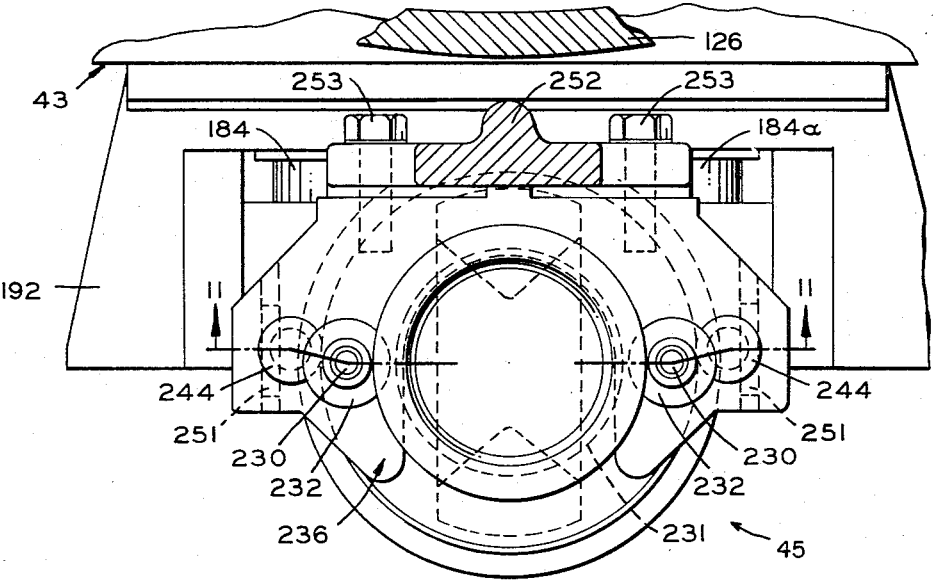
FIG. 10 is a fragmentary, enlarged, horizontal section view of the structure illustrated in FIG. 1, taken along the line 10—10 thereof, and looking in the direction of the arrows.

As best seen in FIG. 11, a tubular heater nozzle body 235 has its upper end slidably mounted in the heater body sleeve 229 and is mounted for slidable movement upwardly and downwardly in the sleeve 229. As shown in FIGS. 10 and 11, a substantially U-shaped heater body pusher 236 is operatively connected to the body 235. As best seen in FIG. 11, the heater nozzle body 235 has an outwardly sloping shoulder 237 on which is seated the mating sloping sealing surface 238 of the U-shaped body pusher 236. A suitable heater nozzle 239 is operatively mounted on the lower end of the heater nozzle body 235 by the following described quick release mechanism which permits the heater nozzle to be detached quickly for cleaning and repair purposes.

The heater nozzle 239 is preferably of the type shown in my co-pending U.S. patent application No. 368,430, filed May 18, 1964 which issued Mar. 21, 1967 as United States Patent No. 3,309,841. For a more complete description of the heater nozzle 239, reference should be made to the last mentioned co-pending application. The disclosure thereof is incorporated by reference herein.

Figure 4:
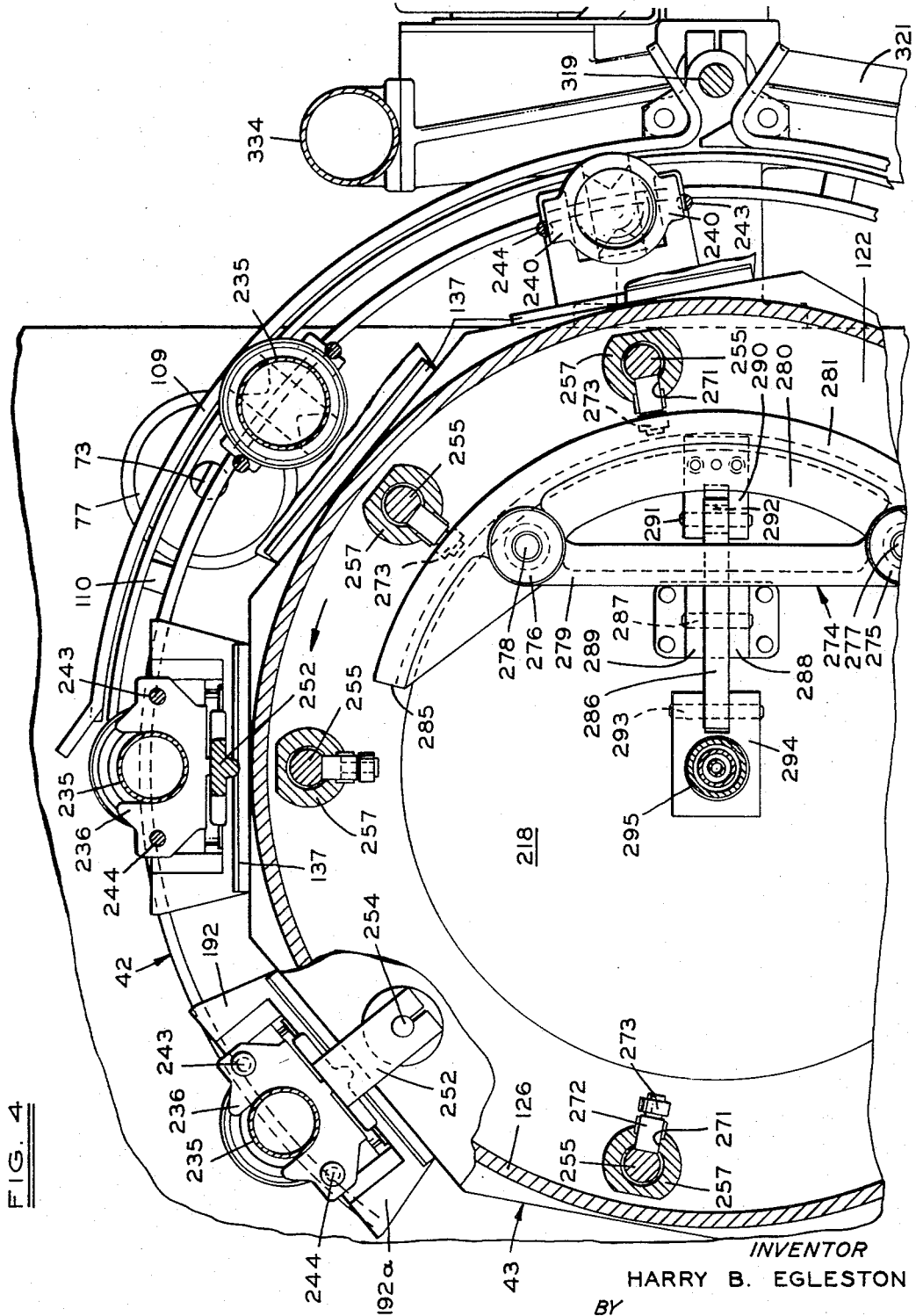
FIG. 4 is an enlarged, partial, horizontal section view of the structure illustrated in FIG. 2, taken along the line 4—4 thereof, and looking in the direction of the arrows.

As shown in FIG. 11, the heater nozzle 239 is detachably secured to the heater nozzle body 235 by a pair of clamping pins 243 and 244. As shown in FIG. 4, the heater nozzle 239 is provided on each side thereof with a flange 240 which is received in the slots 241 and 242 (FIG. 11) formed on the inner sides of the pins 243 and 244, respectively. The pins 243 and 244 are slidably mounted in the vertical holes 245 and 246, respectively, which are formed in the spaced apart arms of the heater body pusher 236. The pins 243 and 244 are provided with enlarged heads on the upper ends thereof against which abut the upper ends of the retainer springs 247 and 248, respectively. The lower ends of the springs 247 and 248 engage the upper face of the heater body pusher 236 and normally bias the pins 243 and 244 upwardly. It will be seen that the last mentioned springs coact with the pins 243 and 244 to retain the heater nozzle 239 in sealing engagement against the flange 249 on the lower end of the heater nozzle body 235. These springs also bias the heater body pusher 236 downwardly against the sloping shoulder 237 on the body 235. The pins 243 and 244 are retained in the holes 245 and 246 by means of the pin slots 250 and the retainer pins 251. The last mentioned structure permits limited upward and downward movement of the clamping pins 243 and 244.

The heater nozzle body 235 at each of the working stations is supported by an individual heater support bracket 252, as shown in FIG. 3. Each of the brackets 252 is carried by the rotary assembly 43 by the following described structure. As shown in FIG. 10, the bracket 252 has a vertical leg portion fixed to the heater body pusher 236 by the screws 253. As shown in FIG. 2, the bracket 252 includes the integral horizontal arm to which is connected a reduced upper end 254 of the vertical shaft 255. The shaft 255 is slidably mounted for upward and downward movement in the vertically disposed cylindrical housing 257 which extends downwardly through the hole 256 formed in the housing wall 127. The housing 257 is provided with a mounting flange which is secured to the housing wall 127 by the screw 258. A cylindrical cap 259 is carried by the shaft 255 and is slidably mounted over the upper open end of the housing 257. The shaft 255 is normally spring biased upwardly to an inoperative position by means of the spring 260 which is disposed within the housing 257. The upper end of the spring 260 abuts the inside of the cap 259 and the lower end of the spring abuts a retainer member 261 disposed in the housing 257.

As shown in FIG. 2, the shaft 255 is journaled in a bushing 262 which is supplied with a suitable lubricating oil by means of the fitting 263, the supply pipe 264, the reservoir 265 and the supply line 266. The shaft 255 is provided with a retainer ring 267 which engages a ring on the lower end of the housing 257 to limit the upward movement of the shaft 255 in the housing 257. The shaft 255 is moved downwardly in order to move the heater nozzle 239 downwardly into a container 10 for a heating operation by the following described cam structure.

As shown in FIGS. 2 and 4, the housing 257 is provided with the longitudinally disposed slot 271 along the inner side thereof for the sliding reception of the cam roller holder 272. The cam roller holder 272 is secured to the shaft 255 by any suitable means, as by suitable attaching screws. As best seen in FIG. 4, the cam roller holder 272 carries a cam roller shaft on which is operatively carried the cam roller 273. As best seen in FIGS. 2 and 4, the cam roller 273 at each of the work stations is adapted to operatively engage the heater operating cam 274 when moving the heater nozzle 239 at each station downwardly to the upper open end of the container 10 disposed at the station.

The heater operating cam 274 is provided with the pair of spaced apart bosses 275 and 276 for slidable mounting of the same on the vertical posts 277 and 278, respectively. The posts 277 and 278 are fixedly mounted by any suitable means on the upper wall 219 of the stationary cam 218. As shown in FIG. 4, the bosses 275 and 276 are interconnected by the brace 279. The cam 274 further includes the arcuately shaped body 280 which is integrally formed with the boses 275 and 276. The cam body portion 280 is adapted to be disposed along the path of travel of the cam rollers 273. As shown in FIGS. 4 and 12, a cam flange 281 is integrally formed on the outer face of the cam body portion 280 and is shaped as shown in FIG. 12. The numerals 284 and 285 in FIG. 4 and 12 indicate the entrance end and exit end of the cam flange 281.

As shown in FIG. 13, the leading edge 284 of the cam 274 is disposed slightly in advance of the point where the sealing cam 218 commences to cam the sealing cam roller 210 downwardly. Accordingly, the heater cam rollers 273 are cammed downwardly approximately 1° of angular movement before the sealing cam roller 210 is cammed downwardly. As shown in FIG. 12, the heater cam roller 273 is cammed downwardly through the first 21° angular movement of this roller to bring the heater nozzle downwardly into the open end of the container 10. The roller 273 is then held in a dwell position relative to its elevated position on the rotary assembly 43 for a period of 108°. During this last mentioned period, the heater nozzle 239 is maintained in close relationship with the container closure panels for heating the same in a selective and efficient manner. When the cam roller 273 reaches the position on the cam 274 as shown by 129°, the cam roller is actuated upwardly by its respective return spring and rises during the next 21° angular movement. At the end of this rise period the cam roller 273 leaves the exit end 285 of the cam 274.

The machine is provided with safety means for moving all of heater nozzles out of the containers in case of an emergency. As shown in FIG. 4, a lever arm 286 is pivotally mounted by the pin 287 between the vertical arms 288 and 289 of a clevis mounted on the fixed cam 218. The outer end of the lever 286 is provided with a slot in which is slidably mounted the sliding block 292. The sliding block 292 is operatively connected by means of the pivot pin 291 to the bracket 290 fixedly secured to the cam 274.

The inner end of the lever 286 is pivotally mounted by means of the pin 293 between a pair of arms 294 which are secured to the upper end of the heater cam elevating tube 295. As shown in FIG. 2, the elevating tube 295 is provided on the lower end thereof with a pair of spaced apart fixed arms 296 between which is pivotally mounted, by means of the pin 297, the bell crank 298. The bell crank 298 is pivotally mounted by means of the pin 299 on the bracket 300 which is fixed to the base 40. The bell crank 298 is pivotally mounted by mean of the pin 301 to the clevis 302 fixed on the outer end of the cylinder rod 303. The cylinder rod 303 is operatively mounted in a suitable air cylinder generally indicated by the numeral 304 which is pivoted by means of the pin 305 on the bracket 306. The bracket 306 is fixed to the housing 40. It will be seen that if an emergency occurs, the air cylinder may be operated by any suitable control means in accordance with certain actuation signals to move the tube 295 downwardly and pivot the lever 286 in a counterclockwise direction as viewed in FIG. 2 to raise the cam 274. The raising of the cam 274 permits the springs 260 in the respective housings 257 to raise the heating means 45 at their respective stations.

As shown in FIGS. 13 and 15, the sealing machine is provided with an auxiliary heater cam 310 which functions to insure raising of the heater means after a heating cycle. The cam 310 is fixedly secured to the upper side of the stationary cam 218 by means of the screws 311. The leading end 312 of the cam 310 is disposed under the exit end 285 of the heater cam 274. In the event that a heater cam roller 273 is not in a raised position due to its respective return spring 260 being inoperative, the cam roller 273 will engage the upwardly sloping edge 313 on the cam 310 so as to move the respective heater shaft 255 upwardly. The cam roller 273 then rolls over the dwell surface 314 and the sloping portion 315 and exits at the cam rear end 316.

HOT AIR PLENUM

As best seen in FIG. 3, the hot air plenum 46 includes the outer annular wall 317 to which is fixed a plurality of support brackets 318 that are operatively connected to the vertical support rods 319 and 320. As shown in FIG. 1, the support rod at the rear of the machine is indicated by the numeral 320 and rests on the air supply manifold 321. The other support rods 319 are fixed to the base housing 40.

As shown in FIG. 3, the hot air plenum 46 further includes the inner annular wall 322 which is spaced apart from the outer wall 317 and which curves upwardly and outwardly to join the outer wall 317, as shown in FIG. 2. A first hot air supply chamber 327 is formed in the plenum 46 by means of the dividing walls 323 and 324, as shown in FIG. 3. The dividing walls 323 and 324 are spaced apart an angular distance of about 84°. A second hot air supply chamber 331 is formed in the plenum 46 by the dividing walls 324 and 325, and these walls are spaced apart an angular distance of about 84°. The first chamber 327 supplies hot air at a high temperature for activating the thermoplastic on a container. The second chamber 331 supplies hot air at a temperature substantially the same as or, as required, lower than that in chamber 327 in order to maintain and regulate the temperature of the thermoplastic in sealing condition during the initial sealing portion of the sealing cycle. The rest of the annular plenum 46 is divided into two compartments by means of the dividing wall 326, and the walls 323, 325 are provided with apertures (not shown) to allow for the partial heating of these compartments to reduce cooling of nozzles 239 during their non-heating cycle.

As shown in FIG. 3, hot air is supplied to the high temperature chamber 327 through the inlet opening 328 from the elbow 329 which is secured by suitable means to the outer plenum wall 317. The elbow 329 is connected to the burner barrel 330, as shown in FIG. 2. The chamber 331 is provided with hot air through the inlet opening 332 which communicates with the elbow 333. As shown in FIG. 1, the elbow 333 is connected to the burner barrel 334. The burner barrels 330 and 334 are supported by the manifold 321 which is fixed to the base housing 40. A suitable air supply blower 338 is supported on the manifold 321 and supplies secondary air under pressure to the manifold 321 which conducts the air to the burner barrels 330 and 334. The blower 338 is driven by the motor 339. A primary air line 340 is connected to a high-pressure air supply (not shown) for feeding air to a pair of suitable burners 342 and 343 which are mounted in the lower ends of the burner barrels 330 and 334. The burners 342 and 343 may be of any suitable type and they are adapted to heat the secondary air which is forced through the manifold 321 by means of the blower 338. As shown in FIG. 2, the hot air plenum includes a top enclosure wall 346 which forms an insulation chamber. The sealing machine is provided with a dust cover 345 which covers the entire unit and is supported by the wall 346.

OPERATION

In use, the heating and sealing machine would pick up the filled containers 10 at the point 225, as shown in FIG. 5, and carry the containers through a circular path of operation during which successive heating and sealing cycles are carried out on the containers in the manner described hereinbefore under the detailed discussions of the heating and sealing means of the machine. The completed containers are discharged at the discharge station 50 and they are then ready for delivery to the consumer.

It will be seen from an inspection of FIGS. 12, 13 and 14 that the containers are subjected to a heating cycle of approximately 168° angular travel. FIG. 14 shows that the sealing jaws commence the closing action on the container top closure panels during the last twenty-four degrees travel through the heating cycle. The sealing cycle continues through an angular travel distance of about 136°. The sealing jaws at each station are water cooled during the angular travel between the 180° and 32° positions shown in FIG. 14. It will be understood that any suitable timing means may be used to actuate the air cylinder 304 in the event that the machine is inadvertently stopped. Practical experience shows that the heating and sealing machine of the present invention provides an efficient heating action on the containers to activate the thermoplastic coating with a lower amount of heat than heretofore possible. The machine of the present invention is also capable of sealing a greater number of containers than is possible with the prior art sealing machines during a specified time.

While it will be apparent that the preferred embodiment of the invention herein disclosed is well calculated to fulfill the objects above stated, it will be appreciated that the invention is susceptible to modification, variation and change without departing from the proper scope or fair meaning of the claims.

What I claim is:
1. In a machine for heating and sealing the top end closure panels of a thermoplastic coated container, the combination comprising:
  (a) a support means,
  (b) a rotary assembly carried by said support means and being provided with heating means and sealing means for heating and sealing the top end closure panels of a thermoplastic coated container while the assembly is rotating,
  (c) hot air supply means disposed in operative engagement with said rotary assembly for supplying said heating means with heated air,
  (d) said hot air supply means includes,
    (1) a stationary hot air plenum disposed in operative engagement with said rotary assembly for distributing heated air to said heating means,
    (2) a hot air generating means connected to said plenum for supplying hot air to the same,
  (e) said stationary hot air plenum includes at least two hot air chambers for distributing heated air to said heating means, and
  (f) said hot air generating means supplies hot air to one of said chambers at a high temperature and to the other of said chambers at a lower temperature.

2. In a machine for heating and sealing the top end closure panels of a thermoplastic coated container, the combination comprising:
  (a) a support means including a container conveyor means,
  (b) a housing rotatably mounted on said support means,
  (c) means operatively connected to said housing for rotating the same in a continuous motion,
  (d) heating and sealing means carried on said housing for heating and sealing the top end closure panels of thermoplastic coated containers moving over the conveyor means while the housing is rotating,
  (e) hot air supply means disposed in operative engagement with said heating means for supplying said heating means with heated air,
  (f) said heating means includes a plurality of heater assemblies disposed in spaced apart positions about said housing and over said conveyor means, and
  (g) each of said heater assemblies is movably mounted on said housing for movement toward and away from containers passing over said conveyor means.

3. In a machine for heating and sealing the top end closure panels of a thermoplastic coated container, the combination comprising:
  (a) a support means including a container conveyor means,
  (b) a housing rotatably mounted on said support means,
  (c) means operatively connected to said housing for rotating the same in a continuous motion,
  (d) heating and sealing means carried on said housing for heating and sealing the top end closure panels of thermoplastic coated containers moving over the conveyor means while the housing is rotating,
  (e) hot air supply means disposed in operative engagement with said heating means for supplying said heating means with heated air,
  (f) said heating means includes a plurality of heater assemblies disposed in spaced apart positions about said housing and over said conveyor means, and
  (g) each of said heater assemblies includes,
    (1) a heater nozzle body,
    (2) a heater nozzle detachably mounted on the heater nozzle body.

4. In a machine for heating and sealing the top end closure panels of a thermoplastic coated container, the combination comprising:
  (a) a support means including a container conveyor means,
  (b) a housing rotatably mounted on said support means,
  (c) means operatively connected to said housing for rotating the same in a continuous motion,
  (d) heating and sealing means carried on said housing for heating and sealing the top end closure panels of thermoplastic coated containers moving over the conveyor means while the housing is rotating,
  (e) hot air supply means disposed in operative engagement with said heating means for supplying said heating means with heated air,
  (f) said heating means includes a plurality of heater assemblies disposed in spaced apart positions about said housing and over said conveyor means,
  (g) means for normally maintaining said heater assemblies in a raised position over said conveyor means, and
  (h) means for selectively lowering said heater assemblies for predetermined time intervals to bring them into a heating position adjacent the top closure panels of a container while positioned on said conveyor means.

5. In a machine for heating and sealing the top end closure panels of a thermoplastic coated container, the combination comprising:
(a) a support means including a container conveyor means,
(b) a housing rotatably mounted on said support means,
(c) means operatively connected to said housing for rotating the same in a continuous motion,
(d) heating and sealing means carried on said housing for heating and sealing the top end closure panels of thermoplastic coated containers moving over the conveyor means while the housing is rotating,
(e) hot air supply means disposed in operative engagement with said heating means for supplying said heating means with heated air,
(f) said hot air supply means includes,
   (1) a stationary hot air plenum disposed in operative engagement with said housing for distributing heated air to said heating means,
   (2) a hot air generating means connected to said plenum for supplying hot air to the same,
(g) said stationary hot air plenum includes at least two hot air chambers for distributing heated air to said heating means, and
(h) said hot air generating means supplies hot air to one of said chambers at a high temperature and to the other of said chambers at a lower temperature.

6. In a machine for heating and sealing the top end closure panels of a thermoplastic coated container, the combination comprising:
(a) a support means including:
   (1) a base,
   (2) a vertical support post,
   (3) a container conveyor means,
(b) a housing rotatably mounted on said support post,
(c) drive means carried by said base and operatively connected to said housing for rotating the same in a continuous motion,
(d) a plurality of heater assemblies disposed in spaced apart positions about said housing and over said conveyor means,
(e) a plurality of sealer assemblies disposed in spaced apart positions about said housing and over said conveyor means,
(f) a stationary hot air plenum disposed in operative engagement with said heater assemblies for distributing heated air to said heater assemblies,
(g) a hot air generating means connected to said plenum for supplying hot air to the same,
(h) each of said sealer assemblies includes a pair of sealer jaws operatively disposed relative to each other and pivotally mounted on said housing between an adjacently disposed heater means and said conveyor means,
(i) each of said sealing jaws is provided with means for moving the jaws between open, partially closed and fully closed positions at predetermined time intervals, and
(j) said means for moving the sealer jaws comprises a cam operated means.

7. In a machine for heating and sealing the top end closure panels of a thermoplastic coated container, the combination comprising:
(a) a support means including:
   (1) a base,
   (2) a vertical support post,
   (3) a container conveyor means,
(b) a housing rotatably mounted on said support post,
(c) drive means carried by said base and operatively connected to said housing for rotating the same in a continuous motion,
(d) a plurality of heater assemblies disposed in spaced apart positions about said housing and over said conveyor means,
(e) a plurality of sealer assemblies disposed in spaced apart positions about said housing and over said conveyor means,
(f) a stationary hot air plenum disposed in operative engagement with said heater assemblies for distributing heated air to said heater assemblies,
(g) a hot air generating means connected to said plenum for supplying hot air to the same,
(h) each of said heater assemblies is movably mounted on said housing for movement toward and away from container passing over said conveyor means,
(i) each of said heater assemblies includes,
   (1) a heater nozzle body,
   (2) a heater nozzle detachably mounted on the heater nozzle body,
(j) each of said heater bodies is provided with means for normally maintaining the same in a raised position over said conveyor means, and
(k) said machine includes means for selectively lowering said heater body for predetermined time intervals to bring said heating nozzle into a heating position within the top closure panels of a container on said conveyor means.

8. The machine for heating and sealing the top end closure of a thermoplastic coated container as defined in claim 7, wherein:
(a) at least one lifter rack is mounted to and is part of said support means,
(b) said lifter rack supports said container conveyor means, and
(c) an actuation means is mounted on said support means for moving said lifter rack in various up and down positions from said heating and sealing means.

9. In a machine for heating and sealing the top end closure panels of a thermoplastic coated container, the combination comprising:
(a) a support means including a container conveyor means,
(b) a housing rotatably mounted on said support means,
(c) means operatively connected to said housing for rotating the same in a continuous motion,
(d) heating and sealing means carried on said housing for heating and sealing the top end closure panels of thermoplastic coated containers moving over the conveyor means while the housing is rotating,
(e) hot air supply means disposed in operative engagement with said heating means for supplying said heating means with heated air,
(f) said sealing means includes a plurality of sealer assemblies disposed in spaced apart positions about said housing and over said conveyor means,
(g) each of said sealer assemblies includes a pair of sealer jaws operatively disposed relative to each other and pivotally mounted on said housing between and adjacently disposed from said heater means and said conveyor means,
(h) means for moving each pair of sealer jaws between open, partially closed and fully closed positions at predetermined time intervals.

10. The machine for heating and sealing the top end closure of a thermoplastic coated container as defined in claim 6, wherein:
(a) at least one lifter rack is mounted to and is part of said support means,
(b) said lifter rack supports said container conveyor means, and
(c) an actuation means is mounted on said support means for moving said lifter rack in various up and down positions from said heating and sealing means.

11. The machine for heating and sealing the top end closure of a thermoplastic coated container as defined in claim 2, wherein:

(a) at least one lifter rack is mounted to and is part of said support means, (b) said lifter rack supports said container conveyor means, and (c) an actuation means is mounted on said support means for moving said lifter rack in various up and down positions from said heating and sealing means.

12. The machine for heating and sealing the top end closure panels of a thermoplastic coated container as defined in claim 1, wherein:

(a) said hot air generating means includes,
(1) a separate burner means for each chamber mounted in a tubular member, and
(2) means for supplying air under pressure to each of said tubular members for heating by said burners to different temperatures before passage into said chambers.

13. The machine for heating and sealing the top end closure panels of a thermoplastic coated container as defined in claim 12, wherein:

(a) said two plenum hot air chambers are arcuately shaped and are disposed relative to the heating means on the rotary assembly so that first the high temperature air is supplied to the heating means and then, second, the lower temperature air is supplied to the heating means.

14. In a machine for heating and sealing the top end closure panels of a thermoplastic coated container, the combination comprising:

(a) a support means including a container conveyor means;

(b) a housing rotatably mounted on said support means;

(c) means operatively connected to said housing for rotating the same in a continuous motion;

(d) heating and sealing means carried on said housing for selective hot air heating and sealing the top end closure panels of thermoplastic coated containers moving over the conveyor means while the housing is rotating;

(e) hot air supply means disposed in operative engagement with said heating means for supplying said heating means with heated air; and (c) said sealing means including a water cooling means.

15. The machine for heating and sealing the top end closure panels of a thermoplastic coated container as defined in claim 14, wherein:

(a) said heating means includes a plurality of heater assemblies disposed in spaced apart positions about said housing and over said conveyor means; and (b) each of said heater assemblies is movably mounted on said housing for movement toward said containers passing over said conveyor means to a selective hot air container heating position and away from said containers to a retracted position during sealing of said top end closure.

16. The machine for heating and sealing the top end closure panels of a thermoplastic coated container as defined in claim 3, including:

(a) means for normally maintaining said heater nozzle body in a raised position over said conveyor means, and (b) means for selectively lowering said heater body for predetermined time intervals to bring said heater nozzle into a heating position within the top closure panels of a container on said conveyor means.

17. The machine for heating and sealing the top end closure panels of a thermoplastic coated container as defined in claim 16, wherein:

(a) said means for normally maintaining said heater nozzle body in a raised position comprises a spring operated means.

18. The machine for heating and sealing the top end closure panels of a thermoplastic coated container as defined in claim 16, wherein:

(a) said means for selectively lowering said heater nozzle body comprises a cam operated means.

19. The machine for heating and sealing the top end closure panels of thermoplastic coated container as defined in claim 17, wherein:

(a) said means for normally maintaining said heater nozzle body in a raised position further includes an auxiliary cam operated means.

20. The machine for heating and sealing the top end closure panels of a thermoplastic coated container as defined in claim 9, wherein:

(a) said means for moving the sealer jaws comprises a cam operated means.

21. The machine for heating and sealing the top end closure panels of a thermoplastic coated container as defined in claim 20, wherein said cam operated means includes:

(a) a stationary cam mounted on said support means, (b) a toggle link means connected to said sealer jaws, and (c) a cam follower connected to said toggle link means and being disposed in operative engagement with said stationary cam.

22. The machine for heating and sealing the top end closure panels of a thermoplastic coated container as defined in claim 18, including:

(a) means for disabling said cam operated means to raise said heater nozzle body in the event of stoppage of the machine.

23. The machine for heating and sealing the top end closure panels of a thermoplastic coated container as defined in claim 14, wherein:

(a) said hot air supply means includes,
(1) a stationary hot air plenum disposed in operative engagement with said housing for distributing heated air to said heating means, and
(2) a hot air generating means connected to said plenum for supplying hot air to the same.

24. The machine for heating and sealing the top end closure panels of a thermoplastic coated container as defined in claim 23, wherein:

(a) said hot air generating means includes,
(1) a burner means mounted in a tubular member which is connected to the plenum, and
(2) means for suppying air under pressure to said tubular member for heating by said burner before passage into said plenum.

25. The machine for heating and sealing the top end closure panels of a thermoplastic coated container as defined in claim 5, wherein:

(a) said hot air generating means includes,
(1) a separate burner means for each chamber mounted in a tubular member, and
(2) means for supplying air under pressure to each of said tubular members for heating by said burners to different temperatures before passage into said chambers.

26. The machine for heating and sealing the top end closure panels of a thermoplastic coated container as defined in claim 25, wherein:

(a) said two plenum hot air chambers are arcuately shaped and are disposed relative to the heating means on the rotary assembly so that first the high temperature air is supplied to the heater means and then, second, the lower temperature air is supplied to the heater means.

27. The machine for heating and sealing the top end closure panels of a thermoplastic coated container as defined in claim 6, wherein:

(a) each of said heater assemblies is movably mounted on said housing for movement toward and away from containers passing over said conveyor means;
(b) each of said heater assemblies includes,
(1) a heater nozzle body, and
(2) a heater nozzle detachably mounted on the heater nozzle body;
(c) each of said heater bodies is provided with means for normally maintaining the same in a raised position over said conveyor means; and
(d) said machine includes means for selectively lowering said heater body for predetermined time intervals to bring said heating nozzle into a heating position within the top closure panels of a container on said conveyor means.

References Cited
UNITED STATES PATENTS

| | | | |
|---|---|---|---|
| 3,006,120 | 10/1961 | Grafingholt | 53—112 |
| 3,186,143 | 6/1965 | Borkmann et al. | 53—375 |
| 3,207,049 | 9/1965 | Monroe et al. | 53—375 |

WILLIAM W. DYER, JR., *Primary Examiner.*

R. ALVEY, *Assistant Examiner.*